INVENTOR.
HOEL L. BOWDITCH

INVENTOR.
HOEL L. BOWDITCH

United States Patent Office 3,620,135
Patented Nov. 16, 1971

3,620,135
DIFFERENTIAL PRESSURE CAPSULE WITH TEMPERATURE COMPENSATION
Hoel L. Bowditch, Foxboro, Mass., assignor to The Foxboro Company, Foxboro, Mass.
Filed Feb. 7, 1969, Ser. No. 797,545
Int. Cl. F16j 3/00
U.S. Cl. 92—97                                    5 Claims

ABSTRACT OF THE DISCLOSURE

In a motion balance capsule for measurement of differential pressures in process applications, a pair of matched diaphragms each exhibiting a similar change in effective area with stroke are employed to compensate temperature effects; the diaphragms are set to a stroke yielding equal effective areas for no differential pressure; with the application of pressure, and with a temperature change affecting fill volume, the fill will act upon the difference in effective areas of the stroked diaphragms to produce a tendency to off-set the temperature effect upon the spring rate of the capsule assembly, including the motion balance spring.

---

This invention is for an improvement in differential pressure capsule design, whereby temperature effects are compensated using matched diaphragms each exhibiting a similar change in effective area with stroke. Briefly stated, the capsule employs a pair of matched diaphragms; a motion balance spring adjustment is initially made to stroke the effective areas of both diaphragms to the same area at zero differential. Temperature effect on the fill cancels inasmuch as both diaphragms will tend to either increase or decrease area similarly in response thereto. The temperature effect on the spring rate of the assembly, including the motion balance spring, is compensated by a fill effect related to a shift in stroke from the null position; the overall design provides that the change in spring rate with temperature is equally compensated by the fill effect upon the differential effective areas of the diaphragms as they are stroked off-null.

In the art of differential pressure measurement, especially as relating to process control, the filled capsule has been long-established as a primary transducer element with control instrumentation. Various improvements to capsule design have been made over the years, with a view to improving the reliability and accuracy of measurement under the variable conditions to which the capsule may be exposed. Among the variables affecting capsule performance is temperature, some process conditions exhibiting wide ranges of temperatures.

It is an object of this invention to provide for a temperature compensation arrangement in the capsule to afford an increased accuracy notwithstanding considerable temperature changes. As in a conventional capsule, a set of opposed diaphragms are affixed to the capsule body, with a suitable fill material interposed between the diaphragm and the capsule body. The design of the capsule exemplified is suited for a motion balance application, in which the stroke of the diaphragm pair is proportional to the differential pressure applied across the diaphragm faces. A motion balance spring may be incorporated with the capsule to provide the reaction against the differential pressure application. The reaction spring for the motion balance is exemplified as integral with the capsule design, but it is to be understood that the reaction spring for the motion balance may be incorporated in the capsule top works, the reaction force being supplied to the diaphragm set via the connecting linkage between the capsule and the top works.

The invention employs a pair of diaphragms exhibiting a variable effective area with stroke. It is to be understood that a capsule diaphragm may exhibit a relationship between effective area and stroke.

The art of capsule design does not admit of an exact method for achieving a particular desired change in effective area with stroke. However, many designs have been made, and it is a matter of routine to select from available designs that particular configurations exhibiting most closely the desired characteristics. Preferably, the change in effective area should be linear with stroke, and, conveniently, a 1% change in area for the particular stroke range employed may be suitable for each diaphragm.

The diaphragms are arranged so that their stroke vs. area characteristics oppose one another, with the effective area of one diaphragm increasing while the other diaphragm area decreases; in addition the arrangement is designed to effect an equalization of area at some position in the stroke, which position may be obtained for the zero reference by suitable stroke adjustment. Such an adjustment may readily be effected by varying the tension on the motion balance spring, which spring mediates between the diaphragm pair and a ground reference, such as the capsule body. Such adjustment of spring tension will dictate the position of the diaphragm pair in its stroke under zero differential pressure conditions.

If the diaphragm pair is adjusted for equal effective areas (by suitable stroke positioning) at a nominal temperature such as 80° F., under zero differential pressure conditions, the temperature effect upon the fill will not alter the stroking of the diaphragm pair. Notwithstanding the temperature coefficient of the fill, and the consequent change in volume of fill with temperature, at zero differential pressure fill expansion with increased temperature, for example, will affect both diaphragms similarly, so that their effective areas remain equal, although the areas may increase or decrease together as the fill expands or contracts. Thus, as the diaphragms remain matched in area over temperature changes affecting fill volume, the response of the capsule to zero differential pressure remains constant, and no variation in stroke is thereby effected.

We next consider the condition wherein a differential pressure is applied to the capsule, with a consequent stroking of the diaphragm set. The area vs stroke characteristics for each diaphragm are similar, so that to the extent one diaphragm increases in effective area with stroke the other diaphragm decreases by a similar amount. To the extent such a balance obtains, the actual stroke obtained in response to differential pressure is the same as if the effective areas were constant; this is a consequence of the differential pressure influence upon the effective areas of capsule, whereby the stroking in response to a differential pressure applied to both faces of the capsule is proportional to the average effective area of the two diaphragms. So long as one diaphragm increases in area an equal amount the other decreases, the average effective area of the diaphragm pair remains constant. So long as the average effective area of the diaphragm pair is constant, the actual obtained stroke in response to a particular differential pressure is the same as if the effective areas of each diaphragm were individually constant.

We next consider a temperature effect upon the capsule under the condition of a differential pressure application. Under this situation, a temperature change of the fill volume affects capsule performance, inasmuch as the effective area of one diaphragm will be greater than the effective area of the other diaphragm (both diaphram stroked). The change in fill volume with temperature is designed to have the effect of changing the effective areas by, for example, 2% per 100° F. Balanced against this temperature effect is a spring rate change of 2% per 100° F. for the motion balance reaction spring in the capsule. These two temperature effects are designed to be compensating, so that the effective fill volume change cancels the spring rate change over a temperature range of interest.

These and other advantages of the invention will be apparent from the specification below taken in conjunction with the drawings in which.

Figure 1:
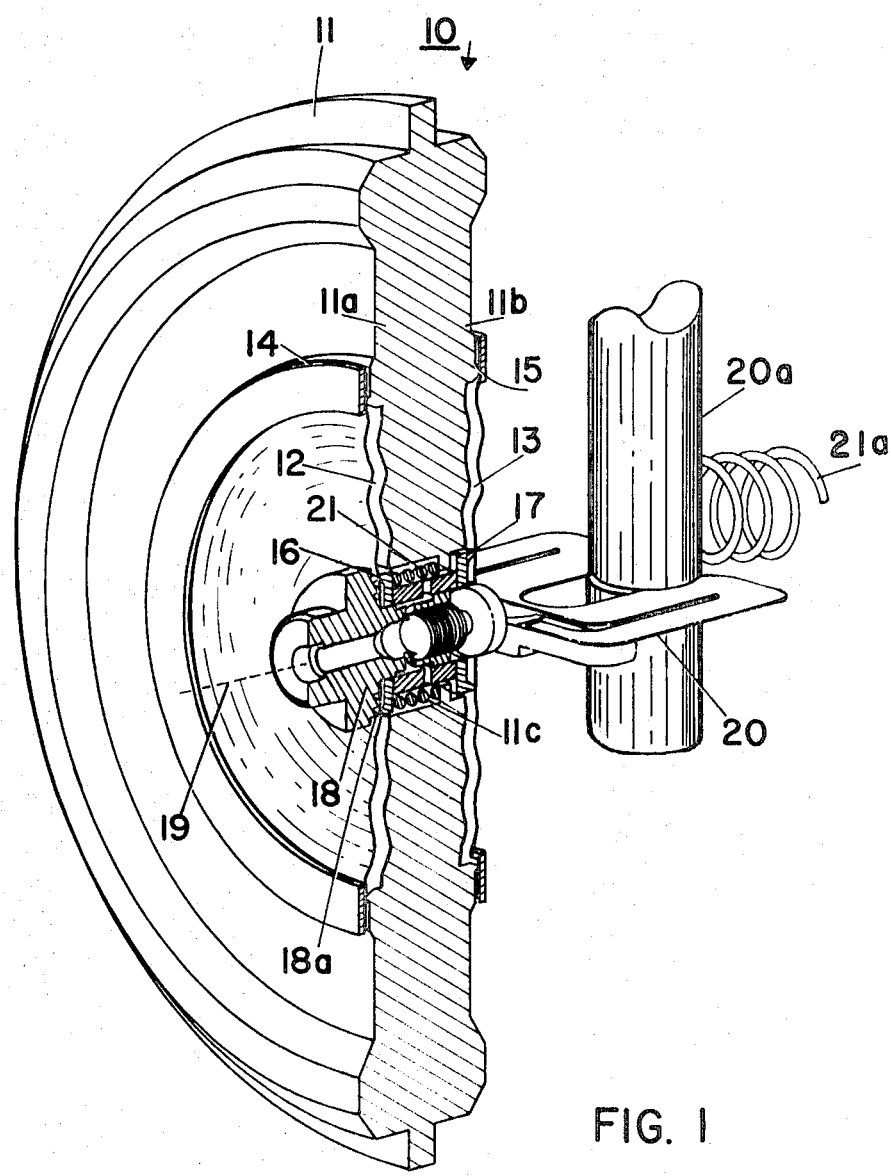
FIG. 1 is a three-dimensional cut-away view of a capsule assembly.
Figure 2:
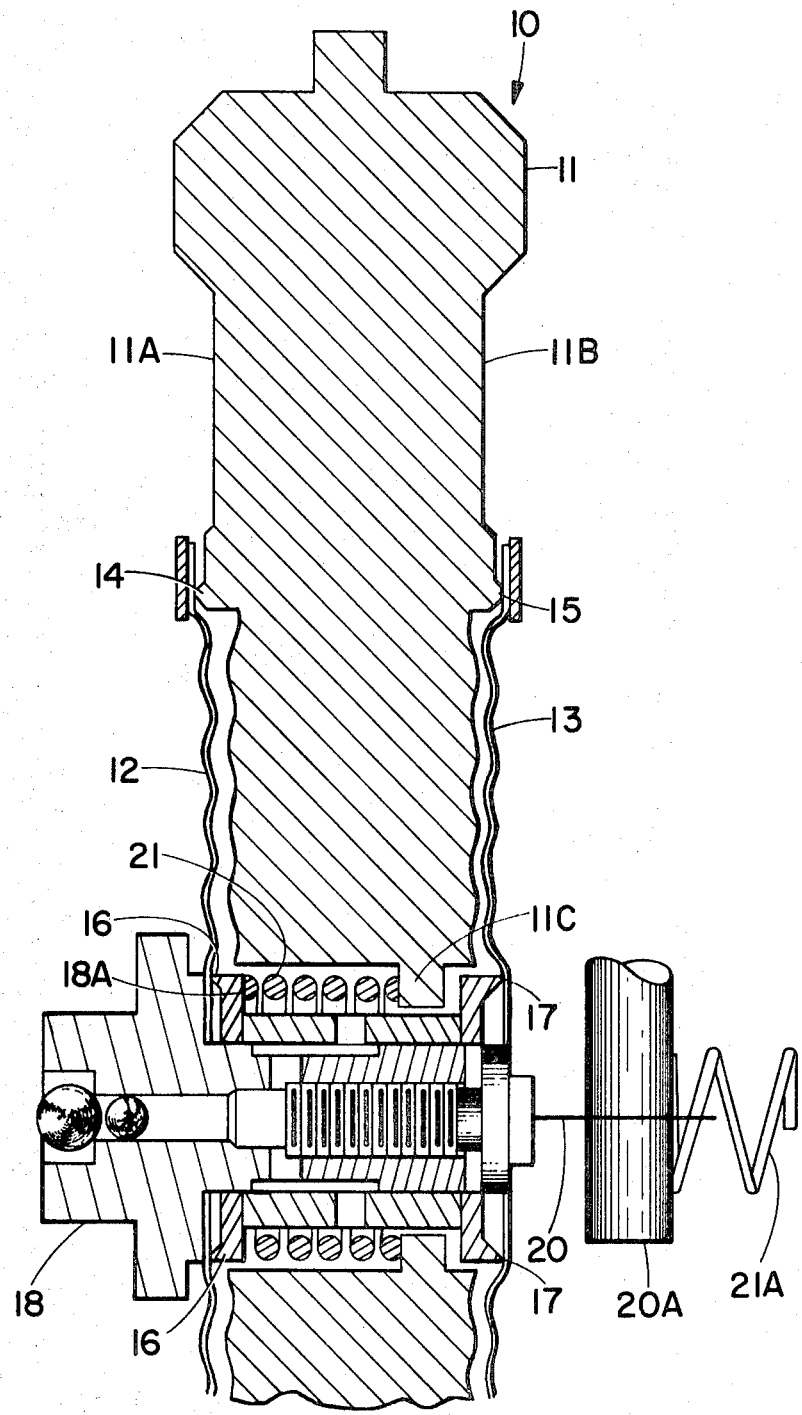
FIG. 2 is a cross-sectional view of the capsule assembly.

Referring to FIG. 1, a capsule assembly 10 is shown in a three-dimensional cut-away form, the section being made along a diameter of the capsule assembly. Capsule body 11 has faces 11A and 11B, one approximately the mirror image of the other. Centrally with the capsule body and either face 11A and 11B thereof are affixed diaphragms 12 and 13, each being approximately circular and each welded at its periphery 14, 15, to faces 11A, 11B respectively in a manner to position each diaphragm 12, 13 concentrically with capsule body 11. A central portion of each diaphragm 12, 13 is welded to portion 16, 17 on hub 18. Thereby, hub 18 solidly connects the central portions of diaphragm 12, 13 together. The arrangement of diaphragm 12, 13 and hub 18 permits stroking of the diaphragm pair by movement of hub 18 along axis 19 thereof. In operation, the application of the differential pressure across diaphragms 12 and 13 results in a stroking of the combination, hub 18 displacing along axis 19 and transmitting the stroke movement through a flexure 20 to a top works assembly, not shown, which may be of conventional nature, such as an assembly performing the functions of that shown in Patent No. 2,806,480.

Capsule assembly 10 is of the motion balance variety in which the motion of hub 18 is restrained by an appropriate springing means, the position reached as a consequence of differential pressure application being obtained when the spring reaction force is equal to that produced in hub 18 by the differential pressure application. With this arrangement, the stroking of hub 18 is very nearly proportional to the differential pressure applied between faces 11A and 11B of capsule assembly 10. In the embodiment shown, a motion balance spring means 21 is shown inserted to tension between portion 18A of hub 18, and projection 11C of capsule body 11. It is to be understood, however, that an equivalent of motion balance spring 21 may be applied through the linkage of the top works, so that the reaction force is applied via flexure 20 to hub 18. The arrangement as shown, permits illustration of all the essential components in the capsule body, thereby showing the particular configuration of the invention.

The stroking of hub 18 in response to differential pressure, and the balancing against the motion balance spring 21, may not be precisely proportional to the applied differential pressure for a variety of reasons. Among these may be counted any alteration in effective area of diaphragm 12, 13 with pressure or stroking. Such a change in effective area is a common concomitant with diaphragms as employed in differential pressure capsules, inasmuch as the diaphragms do not operate as a true piston, being grounded at their periphery while being connected to the stroking hub 18 at their centers. Thus, diaphragms 12, 13 must exhibit flexibility to permit stroking, and many factors of diaphragms construction influence the effective area under a variety of operating conditions. The flexibility or spring rate of the diaphragm is important, a consideration affected by the physical diaphragm configuration, including the particular corrugation design employed. While it is not precisely known all the factors which influence the change in effective area of a particular diaphragm, it can be determined that any particular diaphragm does exhibit effective area, which may be measured, and thereby the characteristics of diaphragms may be ascertained.

Figure 3:
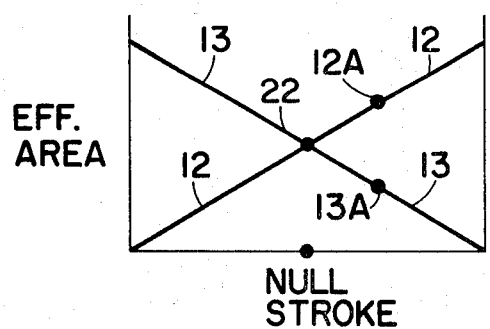
FIG. 3 represents graphically the relation between effective area and stroke for the capsule diaphragms.

In the invention, it is desired that the relationship between effective area and stroke for diaphragms 12 and 13 be approximately that illustrated in FIG. 3. It may be seen that there is a particular stroking of the hub 18 which will produce an equal effective area of both diaphragms 12 and 13, namely point 22.

To make the initial calibration, some nominal temperature condition is selected, such as may be expected to be the typical lowest operating temperature, such as 80° F. A zero adjustment is made at this temperature under the condition where no differential pressure is applied across diaphragm faces 12, 13. Exemplified in FIG. 1 is an adjustment spring 21A provided for the zero adjustment function, as distinct from the motion balance function. Zero adjustment spring 21A is shown externally to the capsule, as a convenient location accessible for adjustment. It is to be understood, however, that the zero adjustment function may be provided by spring 21 alone, employing suitable adjustment means therewith, and it is to be further understood that as such, adjustable spring 21 may be located integrally with the capsule as shown, or may be incorporated with the top works linkage externally from the capsule, and thus more readily accessible for manipulation and adjustment. The zero adjustment is made so that hub 18 together with diaphragms 12, 13, are at a stroke position wherein the effective areas of diaphragms 12, 13 are matched referring to the position corresponding to point 22 in FIG. 3.

Figure 4:
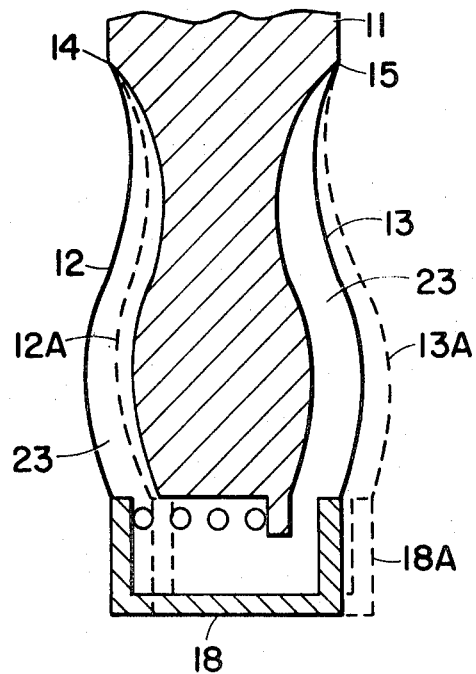
FIG. 4 represents diagrammatically stroked positions of the capsule assembly.

Referring to FIG. 4, it may be assumed that each diaphragm 12, 13 changes its effective area 1% over the stroke range of the capsule assembly, thereby making a sum total of 2% change in effective area with stroke for the diaphragm pair 12, 13. In the materials and components of which the capsule assembly is constructed a spring rate change of 2% per 100° F. is selected for a design objective, this 2% being chosen to off-set the 2% total effective area change of the diaphragm pair 12, 13.

In operation, the high pressure side is applied to diaphragm 12, and the low pressure side is applied to diaphragm 13. Thus is produced a differential pressure across diaphragms 12, 13, thereby producing a tendency to stroke the diaphragms together with hub 18 to a new position represented in FIG. 4 as positions 12A, 13A. The tendency to reposition the diaphragms 12, 13 as a consequence of the application of differential pressure is counter-balanced by the force of motion balance spring 21 so that position 12A, 13A is obtained for the equilibrium condition wherein all forces within the capsule assembly are balanced. It may be observed that this situation as outlined in FIG. 4 obtains under conditions of no temperature change.

Under the condition of the application of a differential pressure causing a stroking condition of the diaphragms 12, 13, an additional condition of temperature change may occur. Since we have started with the lowest typical operating temperature of 80° F., we may anticipate a 100° F. rise in temperature. Using this as the extreme upward rise anticipated, the design objective of a decrease in spring rate of 2% for this 100° F. rise may be chosen. This percentage is typical of a 100° F. temperature influence upon a physical system. Were this the only modification of the characteristics of the capsule assembly, the hub 18 at 180° F. would as a consequence stroke further than it would at 80° F., the additional stroke being required to build up the spring balance for the capsule assembly. However, as an additional counter-balance effect, the temperature effect on the fluid fill 23 in the capsule assembly causes expansion of the fill volume which in turn acts upon the difference in effective areas between diaphragms 12, 13 at their stroked position such as typified by position 12A, 13A, referring to FIGS. 3 and 4. At position 12A, 13A the effective area of diaphragm 12 is greater than the effective area of diaphragm 13 to thereby produce a net force acting in the direction of diaphragm 12 to restrain the stroking of hub 18. At this stroke position 12A, 13A FIG. 3 shows the greater effective area of diaphragm 12 at position 12A and the reduced effective area of diaphragm 13 at position 13A. By design, the fluid fill expansion is of a magnitude to produce a net internal pressure acting in the direction of diaphragm 12 at 100° F. elevation in temperature to counter the 2% reduction in spring rate at this same temperature elevation. Thereby the stroke position for any particular differential pressure is the same at 180° F. as for 80° F.

Other examples of varying degrees of stroke may be considered, position 12A, 13A being an intermediate stroke position. At greater strokes the effect of the reduction in spring rate with temperature will be proportionally greater, as will the difference in effective areas of diaphragms 12 and 13 be also proportionately greater. Thus, it may be seen that the overall design of the capsule provides a temperature compensation arrangement taking advantage of the variation in diaphragm effective area with stroke, employing a fill exhibiting volumetric change with temperature.

While there has been shown what is considered to be a preferred embodiment of the invention, it will be manifest that many changes and modifications may be made therein without departing from the essential spirit of the invention.

What is claimed is:
1. The method of construction of a temperature compensated fluid filled double diaphragm differential pressure capsule comprising the steps of:
   selecting at least one of said diaphragms to have a variable effective area related to stroke position,
   selecting said fill fluid to have a predetermined change in volume with temperature, and
   selecting a motion balance spring for opposing motion of the diaphragm, said spring to have a change in spring rate related to temperature,
   whereby any change in temperature causes a change in internal pressure of the capsule related to the change in volume of the fluid, said differential pressure cooperating with any difference in the effective areas of said diaphragms to cancel the positional effect of said temperature related change in spring rate.

2. A method of claim 1 wherein both diaphragms are selected to exhibit a variable effective area related to stroke position of equal magnitude, one of said diaphragms to increase in effective area and the other to decrease.

3. The method of claim 2 wherein:
   one of the diaphragms is selected to increase its effective area on the order of 1% through the stroke range,
   the other of said diaphragms being selected to decrease its effective area on the order of 1% over the stroke range,
   the fill fluid selected to increase its volume with temperature resulting in an increase in the internal pressure of the capsule of the order of 100 inches of water,
   and the motion balance spring being selected to decrease its spring rate on the order of 2% for an increase of 100° F.

4. The method of claim 1 wherein the diaphragms are selected to have equal effective areas at one unique stroke position.

5. The method of claim 4 including the method of zero adjusting the capsule comprising the steps of:
   externally varying the internal pressure of the fill fluid, and
   adjusting the stroke position of the diaphragm capsule at zero pressure and zero spring stress until the change in fill pressure causes no change in position of the capsule, and
   designating the position so determined as zero position of said capsule.

References Cited
UNITED STATES PATENTS

| | | | |
|---|---|---|---|
| 2,627,183 | 2/1953 | Greenwood et al. | 73—393 |
| 2,650,607 | 9/1953 | Bryant | 137—468 |
| 2,659,390 | 11/1953 | MacLea et al. | 73—393 X |
| 2,770,258 | 11/1956 | Bowditch | 92—97 |
| 3,297,045 | 1/1967 | Beach et al. | 137—85 |
| 3,400,638 | 9/1968 | McEvoy | 73—410 |
| 3,411,363 | 11/1968 | Danvic et al. | 73—393 X |
| 3,468,332 | 9/1969 | Kimura et al. | 137—85 |
| 3,485,104 | 12/1969 | Sanford | 73—393 X |

MARTIN P. SCHWADRON, Primary Examiner

L. J. PAYNE, Assistant Examiner

U.S. Cl. X.R.

73—393, 407